US006918097B2

(12) United States Patent
Parisi

(10) Patent No.: US 6,918,097 B2
(45) Date of Patent: Jul. 12, 2005

(54) METHOD AND APPARATUS FOR DISPLAYING LITERARY AND LINGUISTIC INFORMATION ABOUT WORDS

(75) Inventor: Micheal A. Parisi, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 620 days.

(21) Appl. No.: 09/974,171

(22) Filed: Oct. 9, 2001

(65) Prior Publication Data

US 2003/0067498 A1 Apr. 10, 2003

(51) Int. Cl.[7] .............................................. C06F 17/30
(52) U.S. Cl. ..................................... 715/855; 715/712
(58) Field of Search ............................... 715/853–855, 715/771–773, 734–739, 780, 706–711, 712, 714; 707/104.1, 4, 8; 345/778, 853, 854, 855, 711, 712, 792, 790, 797, 798, 810, 821–824, 834, 765, 744–747

(56) References Cited

U.S. PATENT DOCUMENTS

| | | | |
|---|---|---|---|
| 5,333,254 A | | 7/1994 | Robertson |
| 5,590,250 A | | 12/1996 | Lamping et al. |
| 5,619,632 A | | 4/1997 | Lamping et al. |
| 5,786,820 A | | 7/1998 | Robertson |
| 5,933,822 A | * | 8/1999 | Braden-Harder et al. ....... 707/5 |
| 5,999,182 A | * | 12/1999 | Etchemendy et al. ........ 345/853 |
| 6,034,680 A | * | 3/2000 | Kessenich et al. ........... 345/733 |
| 6,108,698 A | * | 8/2000 | Tenev et al. ................ 709/220 |
| 6,151,595 A | | 11/2000 | Pirolli et al. |
| 6,154,213 A | * | 11/2000 | Rennison et al. ............ 345/854 |
| 6,262,736 B1 | * | 7/2001 | Nelson ........................ 345/854 |
| 6,369,819 B1 | * | 4/2002 | Pitkow et al. ............... 345/440 |
| 6,377,287 B1 | * | 4/2002 | Hao et al. ................... 345/853 |
| 6,405,190 B1 | * | 6/2002 | Conklin .......................... 707/3 |
| 6,411,924 B1 | * | 6/2002 | de Hita et al. ................. 704/9 |
| 6,415,283 B1 | * | 7/2002 | Conklin .......................... 707/3 |
| 6,523,048 B2 | * | 2/2003 | DeStefano ................... 715/526 |
| 6,738,787 B2 | * | 5/2004 | Stead ....................... 707/104.1 |
| 6,769,095 B1 | * | 7/2004 | Brassard et al. ............. 715/513 |
| 6,778,970 B2 | * | 8/2004 | Au .............................. 706/55 |

OTHER PUBLICATIONS

Furnas, G. W., "Generalized Fisheye Views," *CHI 1986 Proceedings*, ACM, Apr. 1986, pp. 16–23.

Lamping, John, Ramana Rao, and Peter Pirolli, "A Focus + Context Technique Based on Hyperbolic Geometry for Visualizing Large Hierarchies," *CHI 1995 Mosaic of Creativity*, May 1995, pp. 401–408.

Inxight, Software, Inc., "See and Go—Inxight Tree Studio," Copyright 2000.

Inxight, Software, Inc., "See and Go—Inxight Hyperbolic Tree® Server," Copyright 2000.

* cited by examiner

*Primary Examiner*—Steven Paul Sax
(74) *Attorney, Agent, or Firm*—Fay, Sharpe, Fagan, Minnich & McKee, LLP

(57) ABSTRACT

A method for displaying literary and/or linguistic information about a "lookup" word/phrase from an information set is provided. The information set is comprised of one or more node link structures. Each node link structure is comprised of a plurality of related nodes. Each node contains information and relationships between nodes provide information about words/phrases. A display system receives a request for information about a "lookup" word/phrase (1). A node link structure is selected and retrieved (2). Hierarchical addresses are assigned to each node, representing a tree structure (4). Display addresses are assigned to each node based on a surface function (e.g., hyperbolic function), representing a mapping of the tree structure to a surface shape corresponding to the surface function (6). The tree structure is rendered to the display. The display simultaneously provides detailed information about the "lookup" word/phrase and its context within the associated node link structure.

21 Claims, 12 Drawing Sheets

METHOD AND APPARATUS FOR DISPLAYING LITERARY AND LINGUISTIC INFORMATION ABOUT WORDS

BACKGROUND OF THE INVENTION

The present invention relates to displaying literary and/or linguistic information about a "lookup" word/phrase from an information set. It finds particular application in conjunction with simultaneously displaying detailed and context information about the "lookup" word/phrase from an associated node link structure and will be described with particular reference thereto. However, it is to be appreciated that the present invention is also amenable to other like applications.

Literary and linguistic information associated with words/phrases is commercially available in hard copy books (e.g., Merriam Webster's Collegiate® Dictionary ($10^{th}$ ed. 1998), Roget's $21^{st}$ Century Thesaurus ($2^{nd}$ ed. 1999), and Harper Collins' Spanish Dictionary (2000)). Literary and linguistic information includes both relationships between words/phrases and attributes of the word/phrase. The relationships of a given word/phrase include identification of related homonyms, synonyms, antonyms, roots, derivatives, variants, inflected forms, and foreign language translations. The attributes of a given word/phrase include definitions, pronunciations, etymology, and usage. Such relationships and attributes can be provided individually or in any combination in a given set of literary and linguistic information.

Literary and linguistic information is also commercially available in various computerized forms. Such computerized information is available in word processor applications, stand-alone software applications, Web-based tools, and the like. Examples of such word processor applications include Microsoft®'s Word and Corel®'s WordPerfect®. Merriam-Webster's Collegiate Dictionary and Thesaurus, Microsoft®'s Encarta World English Dictionary, and Collins' English/Spanish Talking Dictionary are examples of such stand-alone software applications. Merriam-Webster Online at www.m-w.com, Roget's $21^{st}$ Century Thesaurus at www.funkandwagnalls.com, and Freedict.com's English-to-foreign language translation dictionaries at www.freedict.com are examples of such Web-based tools.

The arrangement of literary and linguistic information in hard copy books is well understood. Generally, such books are arranged in tabular style alphabetical lists; usually by the lookup word/phrase and sometimes by topic. The literary and linguistic information is typically text that is either printed with the lookup word/phrase or printed elsewhere and referenced by the lookup word, phrase, or topic.

Currently computerized literary and linguistic information is typically derived from a corresponding hard copy book and displayed in the same table-based and list formats as used in books. Computerized literary and linguistic information is generally displayed in response to search requests. Hyperlinks can be incorporated in the literary and linguistic information to jump to information about the hyperlinked word/phrase from the results of a search request. The primary advantage of computerized literary and linguistic information is the ability to locate and display desired information more quickly. However, the relationships between words/phrases in computerized literary and linguistic information are often lost or cumbersome to navigate as you advance from an initial search to subsequent searches. The word/phrase relationships are valuable to users who are searching and comparing words in order to choose the one most appropriate to their need. Sometimes it is useful to navigate back and forth through the history of a search sequence. It is also sometimes useful to simultaneously visualize three or more levels of word relationships as one narrows their preferences during a search sequence.

Relational databases are useful for storage and retrieval of computerized literary and linguistic information. A relational database of computerized literary and linguistic information typically includes records for words, phrases, and topics. Each record includes the relationships between the word, phrase, or topic and other records of the database.

A lookup word/phrase, in reference to hierarchical structures, is often characterized as a headword. The hierarchical structure originates from the headword and is defined by the relationships between the headword and other words, phrases, and topics of the database. It is well understood that information visualizations provide insights to the underlying data. For example, for any given set of information, new information regarding patterns or relationships can be obtained by looking at attributes of the information. It would be advantageous to utilize a method and apparatus for simultaneously displaying both the detail (i.e., the attributes and relationships of the head word) for the selected literary and linguistic information and the context of the selected information within the entire database (i.e., the hierarchical structure with respect to the selected head word). However, a difficulty lies in displaying large hierarchical structures in a limited display area. Information visualization research has explored the application of interactive graphics and animation technology to visualizing and making sense of larger information sets than would otherwise be practical. One recurring theme has been the power of "focus+context" techniques, in which detailed views of particular parts of an information set are blended in some way with a view of the overall structure of the set.

Furnas, G. W., "Generalized Fisheye Views," CHI '86 Proceedings, ACM, April 1986, pp. 16–23, describes fisheye views that provide a balance of local detail and global context. Section 1 discusses fisheye lenses that show places nearby in great detail while showing the whole world, showing remote regions in successively less detail; a caricature is the poster of the "New Yorker's View of the United States." Section 3 describes a degree of interest (DOI) function that assigns to each point in a structure, a number telling how interested the user is in seeing that point, given the current task. A display can then be made by showing the most interesting points, as indicated by the DOI function. The fisheye view can achieve, for example, a logarithmically compressed display of a tree, as illustrated by FIG. 4 of Furnas for a tree structured text file. Section 4 also describes fisheye views for botanical taxonomies, legal codes, text outlines, a decisions tree, a telephone area code directory, a corporate directory, and UNIX file hierarchy listings. Section 5 indicates that a display-relevant notion of a priori importance can be defined for lists, trees, acylic directed graphs, general graphs, and Euclidean spaces, unlike the geographical example which inspired the metaphor of the "New Yorker's View," the underlying structures need not be spatial, nor need the output be graphic. FIG. 6 of Furnas shows a fisheye calendar.

Lamping, J., Rao, R., and Pirolli, P., "A Focus+Context Technique Based on Hyperbolic Geometry for Visualizing Large Hierarchies," CHI '95 Mosaic of Creativity—Papers, ACM, May 7–11, 1995, pp. 401–410, presents a focus+context (fisheye) technique for visualizing and manipulating large hierarchies. The technique assigns more display space to a portion of the hierarchy while still embedding it in the context of the entire hierarchy. The essence of this scheme is to lay out the hierarchy in a uniform way on a hyperbolic plane and map this plane onto a circular display region. This supports a smooth blending between focus and context, as well as continuous redirection of the focus. This focus+ content technique was referred to as a hyperbolic browser. The hyperbolic browser initially displays a tree with its root at the center, but the display can be smoothly transformed to bring nodes into focus. Two salient properties of the hyperbolic browser were that components of the visual display diminished in size and the quantity of components grew exponentially as they moved outwards from the focused portion of the visual display. Thus the context always included several generations of parents, siblings, and children, making it easier to explore the hierarchy without getting lost.

U.S. Pat. No. 5,590,250 to Lamping et al. ("Lamping '250"), assigned to Xerox Corporation and entitled "Layout of Node-Link Structures in Space with Negative Curvature," discloses a method for layout of node link structures. Under Lamping '250, layout data indicates positions in a negatively curved layout space for nodes in a hierarchical branch of a node link structure. The layout data indicates a parent position for parent nodes and, for children that share a parent node, child positions approximately along a circle in the layout space with the parent position approximately at the circle's center. An approximate base spacing separates adjacent child positions. The radii of circles within the branch together approximate a function that increases slowly with the number of child nodes such that the radii and spacings along circles are all approximately uniform within the branch. The layout data can be obtained from data defining the node link structure. The layout data can be used to perform mappings, each obtaining positions for a subset of the nodes. The layout data can be used to present a first representation of the node link structure on a display. In response to a user signal indicating a change from a first display position near a first feature to a second display position, a second representation can be presented that is perceptible as a changed continuation of the first. The second representation includes, near the second display position, a second feature representing the same part of the node link structure as the first feature. The second representation can be obtained by a transformation of the layout space, which can be a discrete approximation of a hyperbolic plane.

U.S. Pat. No. 5,619,632 to Lamping et al. ("Lamping '632"), assigned to Xerox Corporation and entitled "Displaying Node-Link Structure with Region of Greater Spacings and Peripheral Branches," discloses a method for display of node link structures. Under Lamping '632 node link data defining a node link structure is used to present a sequence of representations on a display. The last representation in the sequence is perceptible as a changed continuation of the first. Each representation includes bounded node features, each with a center of area and a nearest node spacing that define a mid-spacing circle. All mid-spacing circles together determine an outer convex hull enclosing a total area for the representation. The mid-spacing circles of a subset of more spaced node features determine an inner convex hull enclosing approximately half the total area and enclosing a region in which nearest node spacings are in general perceptibly greater than in another region outside the second convex hull. The node features also represent a peripheral branch with lower level nodes that are not represented by more spaced node features. In the peripheral branch, node features that share a parent have centers of area positioned approximately along an arc with sufficiently similar spacings from the center of area of the parent node feature and from adjacent node features that they are perceptible as a group of related node features. The inner convex hulls of the first and last representations include subsets of node features representing different sets of nodes. The sequence can produce a perception that one node feature's nearest node spacing increases while another's decreases. The representations can be presented by a series of iterations, and can be presented at animation speeds to produce a perception of continuously moving node features.

U.S. Pat. No. 5,786,820 to Robertson ("Robertson '820"), assigned to Xerox Corporation and entitled "Method and Apparatus for Increasing the Display Detail of a Tree Structure," discloses a computer-controlled display system and method for visualization of a tree structure so that a greater amount of detail of the tree structure can be displayed in a display area. Under Robertson '820, the tree structure is warped about an arbitrary surface for display. Such an arbitrary surface included surfaces defined by a parabola (FIG. 7), a hyperbola (FIG. 8), or by the intersection of two lines (FIG. 9). As a result, an increased number of nodes could be displayed in each level of the tree. The three-dimensional tree structures depicted in FIGS. 7–9 of Robertson '820 show the hierarchies of the trees flowing from left to right and are sometimes referred to as cone trees.

Based on Xerox research and development, Inxight Software, Inc. ("Inxight") currently offers commercially available products for software development, web page development, and browsers that implement "focus+context" visualization techniques. Inxight's products permit creation and use of interactive displays that provide detailed information for a particular item along with information that reveals relationships of the item to other items in the overall information set. Inxight's web page development product is known as Hyperbolic Tree Server. In conjunction with Hyperbolic Tree Server, Inxight's Tree Studio provides users with a browser that permits users to navigate the displays created by web page developers. Similarly, Inxight's Hyperbolic Tree software development kit enables software developers to integrate visualization displays using "focus+ context" techniques with software applications.

Currently, the "focus+context" visualization techniques described above have not been employed to display literary and linguistic information. It would be useful to implement these "focus+context" visualization techniques or similar techniques in displaying literary and linguistic information. The present invention contemplates a method and apparatus for displaying computerized literary and linguistic information using "focus+context" and similar visualization techniques.

SUMMARY OF THE INVENTION

In accordance with one aspect of the present invention, a method for displaying information from a literary and linguistic information set on a display of a display system is provided. The method comprising the steps of: a) receiving a first request for literary and/or linguistic information about a word/phrase; b) selecting a node link structure associated with the first request; c) retrieving said node link structure from the information set; d) assigning a hierarchical address to each node in said node link structure based on the first request, the hierarchical addresses representing a layout of said node link structure in a tree structure; e) assigning a display address to each node in the tree structure based on a previously determined surface function, the display addresses representing a mapping of the tree structure about a surface shape corresponding to the surface function; and f) rendering the tree structure on the display according to the display addresses so that literary and/or linguistic information associated with the first request is displayed.

In accordance with a more limited aspect of the present invention, a display system for displaying information from a literary and linguistic information set is provided.

One advantage of the present invention is that visualization techniques are used to simultaneously display detailed literary and linguistic information about a word/phrase and context information about the word/phrase with respect to a hierarchy of related words/phrases.

Another advantage of the present invention is that more literary and linguistic information about the word/phrase can be provided in the same display space than in prior display systems and methods.

Another advantage of the present invention is that the literary and linguistic information displayed about the word/phrase includes information about words/phrases at three or more levels of a tree structure originating from the word/phrase of interest.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
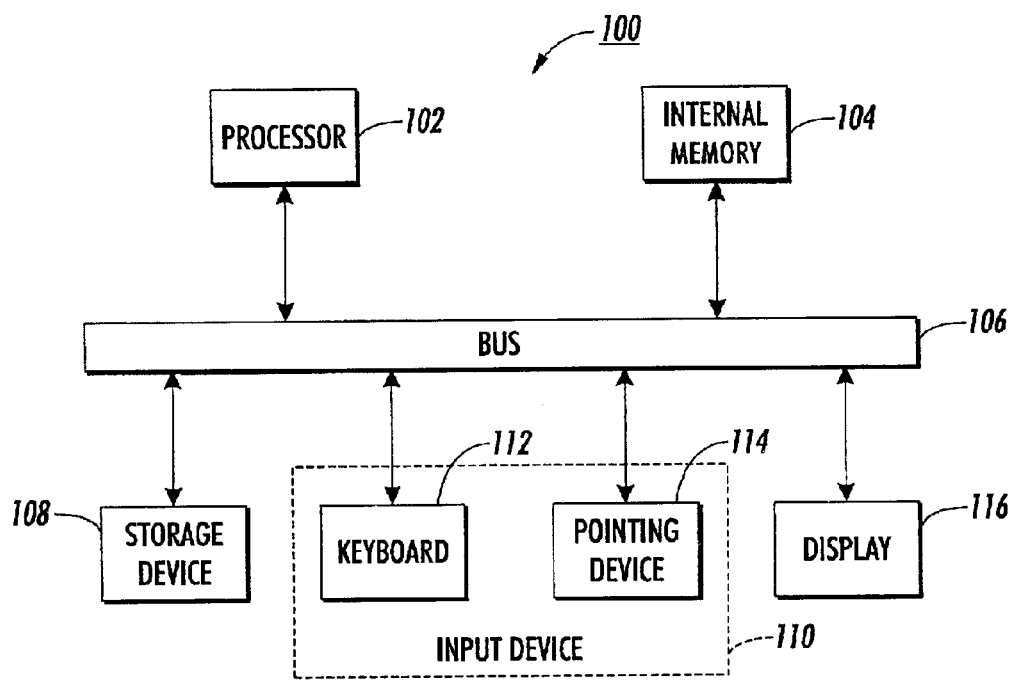
FIG. 1 is a block diagram of a display system in accordance with the preferred embodiment of the present invention.

In describing the present invention, the following terms have been used:

"Antonym" refers to a word of opposite meaning.

"Definition" refers to a statement of the meaning of a word or word group or a sign or symbol.

"Derivative" refers to words formed from the word under consideration (e.g., by adding a noninflectional affix).

"Etymology" refers to the history of a linguistic form shown by tracing its development since its earliest recorded occurrence in the language where it is found by: (i) tracing its transmission from one language to another, (ii) analyzing it into its component parts, (iii) identifying its cognates in other languages, or (iv) tracing it and its cognates to a common ancestral form in an ancestral language.

"Foreign language" refers to one or more languages different in character or origin from a reference language.

"Homonym" refers to one of two or more words spelled and pronounced alike but different in meaning.

"Inflected form" refers to changed forms of a word that distinguish case, gender, number, tense, person, mood, or voice.

"Linguistic" refers to human speech, including the units, nature, structure, and modification of spoken language.

"Literary" refers to the characteristics of human writings or literature, including grammar, structure, and form of written language.

"Node link structure" refers to a data structure of related information. Each information item in the data structure is a node. Links are established between the nodes to represent relationships between the information.

"Pronunciation" refers to an orthographic representation of the correct manner for speaking a word.

"Root" refers to the simple element inferred as the basis from which a word is derived by phonetic change or by extension.

"Synonym" refers to one of two or more words or expressions of the same language that have the same or nearly the same meaning in some or all senses.

"Tree structure" refers to a node link structure arranged in a hierarchy based on priorities assigned to one or more nodes and the links between the nodes.

"Usage" refers to the way in which words/phrases are actually used in a language community.

"Variant" refers to one of two or more different spellings or pronunciations of the same word.

Robertson '820, relating to the field of information display and, in particular, to the display of hierarchical information structures, is incorporated herein by reference. Robertson '820 discloses a method and apparatus for increasing the displayed detail of a tree structure. The invention was used on a display system and provided for visualization of a tree structure so that a greater amount of the detail of the tree structure could be displayed in a display area. In the invention, a tree structure was warped about an arbitrary surface for display. Such an arbitrary surface included a surface defined by a parabola, a hyperbola, or by the intersection of two lines. As a result, an increased number of nodes in each level of the tree could be displayed. Lamping '632, relating to the display of node link structures is also incorporated herein by reference.

U.S. Pat. No. 5,333,254 to Robertson ("Robertson '254) assigned to Xerox Corporation and entitled "Methods of Centering Nodes in a Hierarchical Display" is also incorporated herein by reference. This reference discloses the display of a tree structure in two dimensions and the centering of a selected node along a centerline. The reference further discloses animation steps for scrolling of the tree for centering a node.

A method and apparatus for displaying literary and linguistic information about words/phrases from an information set with an increased amount of information in a display area is described herein. Numerous specific details are set forth, such as data models for representing an information set comprised of one or more node link structures, in order to provide a thorough understanding of the present invention. It would be apparent, however, to one skilled in the art to practice the invention without such specific details. In other instances, specific implementation details such as the system calls for selecting a node link structure, representing the node link structure as a tree structure, and causing the tree structure to be displayed on a display, have not been shown in detail in order not to unnecessarily obscure the present invention.

Related information is often represented in computerized form as a node link structure. Each item of information is represented by a node. Links are established between the nodes to represent relationships between the information. When the information can be prioritized, a frame of reference is established by the priority and the links establish a hierarchy through the structure according to the priority. When literary and linguistic information is requested about a particular "lookup" word/phrase, with respect to the node link structure, that "lookup" word/phrase is prioritized and often referred to as a "head" word/phrase. Once a "lookup" word/phrase is requested, a node associated with the "head" word/phrase is determined. The node associated with the "head" word/phrase is identified as the "roof" node and the links of the node link structure define the hierarchy of the tree structure to be displayed.

As will become apparent in the description below, the present invention applies the basic concepts of node link structures to displaying literary and linguistic information and could be implemented through various forms of node link structures. For example, when representing a literary and linguistic information set in a node link structure, links are established for relationships between words/phrases in the information set. Theoretically, each word/phrase could be related, forming one large node link structure. Practically, however, multiple independent groups of related words/ phrases more likely, forming a plurality of independent node link structures of various sizes.

With reference to FIG. 1, the preferred embodiment of the computer-controlled system 100 is comprised of a plurality of components coupled via a bus 106. The bus 106 may consist of a plurality of parallel buses (e.g. address, data and status buses) as well as a hierarchy of buses (e.g. a processor bus, a local bus and an I/O bus). In any event, the computer-controlled system 100 is further comprised of a processor 102 for executing instructions provided via the bus 106 from an internal memory 104 (note that the internal memory 104 is typically a combination of Random Access Memory (RAM) and Read Only Memory (ROM)). The processor 102 will be used to perform various operations in support of creating the literary and linguistic information displays. Instructions for performing such operations are retrieved from the internal memory 104. Such operations are described in detail below with reference to FIGS. 10–12. The processor 102 and the internal memory 104 may be discrete components or a single integrated device such as an Application Specification Integrated Circuit (ASIC) chip.

Input devices 110, including a keyboard 112 for entering alphanumeric input and a pointing device 114 for manipulating a cursor, are coupled to the bus 106. Lastly, a storage device 108, for storing a literary and linguistic information set, and a display 116, for displaying literary and linguistic information in response to requests for such information about a word/phrase, are also coupled to the bus 106. The keyboard 112 would typically be a standard QWERTY keyboard but may also be a telephone-like keypad. The pointing device 114 (e.g. a mouse, trackball, touchscreen, or glide pad) controls the cursor and typically has a button, switch, or other type of control associated with it to which the performance of certain functions can be programmed. The storage device 108 may be fixed or removable magnetic or optical disk drive.

It is apparent to one of skill in the art that the present invention may be implemented on any suitable computer system providing graphical functionality that permits manipulation of graphical objects in a two-dimensional space. Any such implementation would not depart from the spirit and scope of the present invention.

Figure 2:
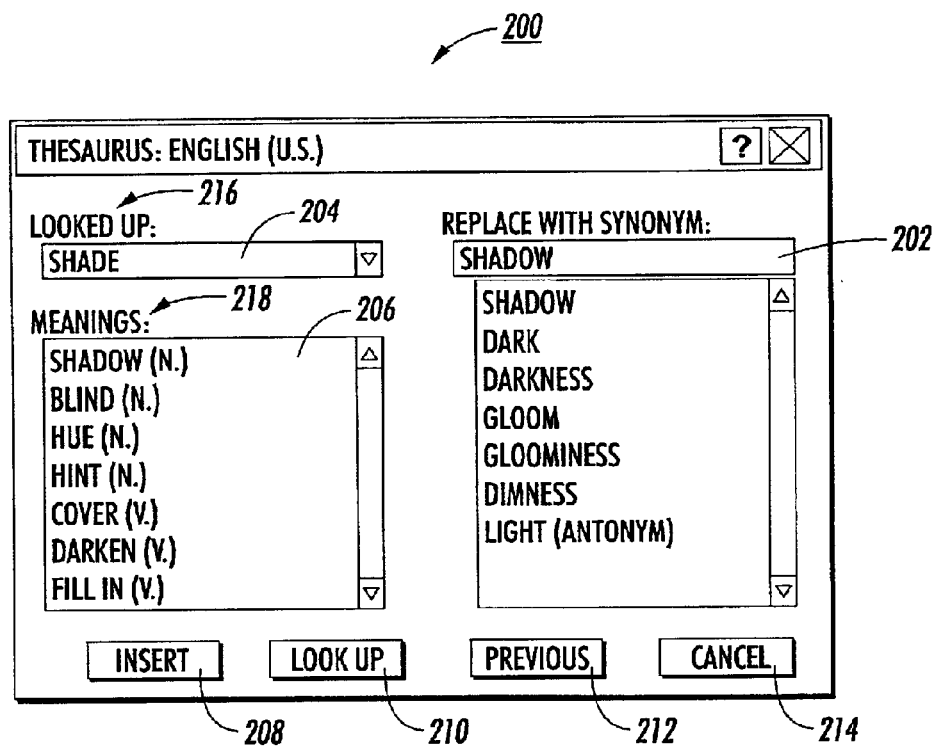
FIG. 2 is an example of the literary and linguistic information (i.e., homonyms, synonyms, and antonyms) displayed in response to a request for such information about "shade" according to a method currently known in the art (i.e., Microsoft® Word's Thesaurus dialog box)

With reference to FIG. 2, a Thesaurus dialog box 200 displaying literary and linguistic information is shown. The Thesaurus dialog box 200 is a tool used in the Microsoft® Word software application. The Thesaurus dialog box 200 includes "Replace with Synonym," "Looked Up," and "Meanings" boxes (202, 204, 206) and "Replace," "Look Up," "Previous," and "Cancel" buttons (208, 210, 212, 214). A word can be looked up by typing it in the "Replace with Synonym" box 202 and clicking the "Look Up" button 210. Once a word is looked up, a list of homonyms is displayed in the "Meanings" box 206 and a list of synonyms and antonyms for the first homonym in the "Replace with Synonym" dialog box 202. If alternate homonyms are selected in the "Meanings" box 206, the "Replace with Synonym" box 202 will display the synonyms and antonyms associated with the selected homonym. The "Looked Up" box 204 displays the last word looked up. If the selected word is not in the computerized thesaurus, the "Looked Up" label 216 above the box changes to "Not Found." The "Meanings" label 218 above the "Meanings" box 206 also changes to "Alphabetical List" and an alphabetic list of entries that are similar in spelling to the word not found is displayed in the "Meanings" box 206. Note that FIG. 2 shows the results of looking up "shade" and selecting the "shade" homonym that is a noun meaning "shadow."

Therefore, "shade" is displayed in the "Looked Up" box 204, "shadow" is highlighted in the "Meanings" box 206, and the "Replace with Synonym" box 202 contains a list of synonyms and one antonym associated with this meaning of "shade."

Additional words are looked up by typing them in the "Replace with Synonym" box 202 as described above or by clicking a word in the "Meanings" box 206, clicking a word in the "Replace with Synonym" box 202, and clicking the "Look Up" button 210. The "Insert" button replaces a selection in the Word document with the word in the "Replace with Synonym" box 202. The "Previous" button 212 displays the last word looked up, its meanings, and synonyms for it. The "Cancel" button 214 closes the Thesaurus dialog box 200.

Figure 3:
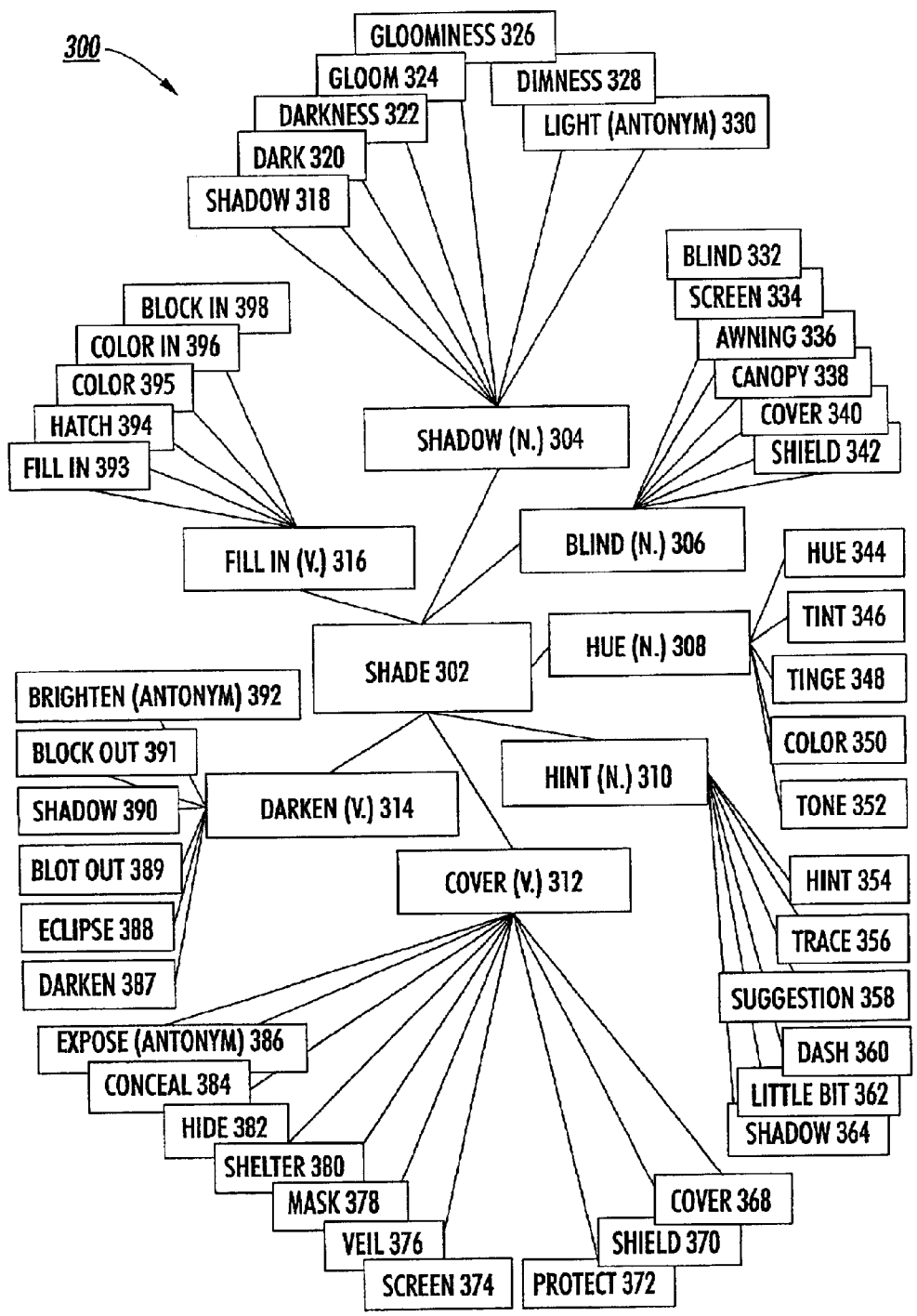
FIG. 3 is an example of literary and linguistic information (i.e., homonyms, synonyms, and antonyms) included in a display rendered in response to a request for such information about "shade" in accordance with the preferred embodiment of the present invention.

With reference to FIG. 3, an example of thesaurus-type literary and linguistic information (i.e., homonyms, synonyms, and antonyms) in a display rendered in accordance with the preferred embodiment of the present invention is shown. Like FIG. 2, FIG. 3 shows the results of looking up thesaurus-type information about "shade" 302. However, there is much more information provided under the present invention (FIG. 3) than in the prior art (FIG. 2). The present invention simultaneously displays the synonyms and antonyms (318–398) of all of the homonyms (304–316) associated with "shade" 302.

Note that the "lookup" word (i.e., "shade" 302) is represented by a node and located at roughly the center of a node link structure. The node link structure is distributed around the central node in a tree structure. "Shade" 302 is a "root" node of the tree structure. Moving outward from the central node, there is a ring of seven (7) words (shadow (n.) 304, blind (n.) 306, hue (n.) 308, hint (n.) 310, cover (v.) 312, darken (v.) 314, and fill in (v.) 316 represented by an intermediate circle of nodes at the second level of the tree structure. The words at the second level (304–316) represent the alternate meanings (i.e., homonyms) for "shade" 302.

Moving outward from the second level, there is a ring of 45 words (318–398) represented by an outer circle of nodes at the third level of the tree structure. The words at the third level (318–398) are divided into seven (7) groups, each group associated with a second-level homonym. Each group represents the synonyms and antonyms associated with a particular meaning (i.e., homonym) of "shade" 302. As shown: (i) where "shade" means shadow (n.) 304 there are six (6) synonyms and one (1) antonym (318–330), (ii) where "shade" means blind (n.) 306 there are six (6) synonyms (332-342), (iii) where "shade" means hue (n.) 308 there are five (5) synonyms (344–352), (iv) where "shade" means hint (n.) 310 there are six (6) synonyms (354–364), (v) where "shade" means cover (v.) 312 there are nine (9) synonyms and one (1) antonym (368–386), (vi) where "shade" means darken (v.) 314 there are five (5) synonyms and one (1) antonym (387–392), and (vii) where "shade" means fill in (v.) 316 there are five (5) synonyms (393–398).

Note that the words in the display are progressively smaller at each level of the tree structure as one moves outward from the "root" node to the lower levels. The present invention incorporates offsetting certain nodes of the display based on considerations that such nodes are of more interest to a viewer than other nodes. Typically, as here, the "lookup" word is given the highest priority and an offset to appear closest to the viewer. Other nodes at any level can be offset to any degree to appear closer than non-offset nodes. As shown in FIG. 3, the nodes at the second level of the tree structure are slightly offset to appear closer than the non-offset third level nodes, but are offset less than the "root" node. The process of requesting literary and/or linguistic information about a "lookup" word, retrieving the information, and displaying the information is provided in more detail below.

Figure 4:
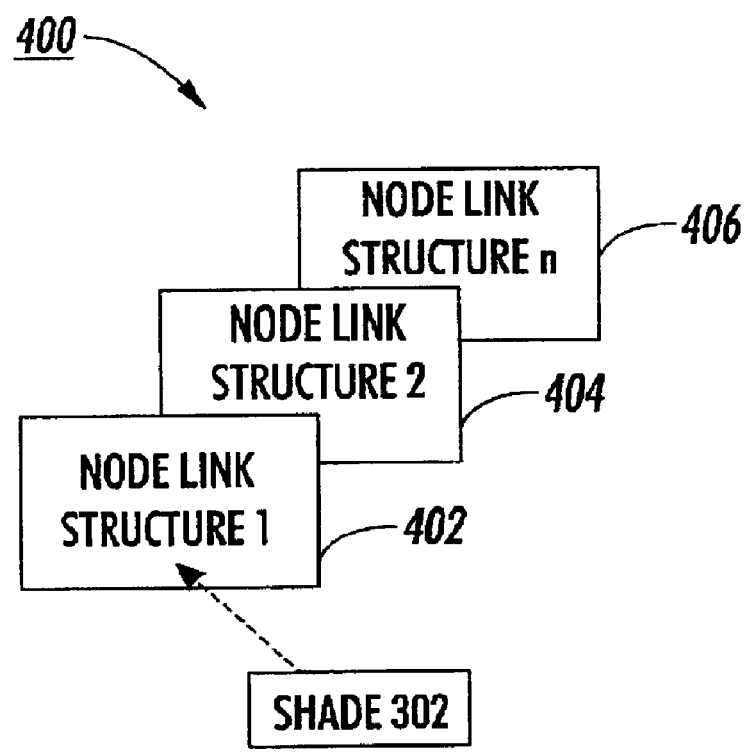
FIG. 4 is a block diagram of a literary and linguistic information set, consistent with the "shade" example of FIG. 3 and in accordance with the present invention.

With reference to FIG. 4 and continuing with the "shade" example, a block diagram of a literary and linguistic information set 400 in accordance with the present invention is provided. A literary and linguistic information set can comprise one or more node link structures. In FIG. 4, a preferred embodiment of the present invention shows an information set 400 comprised of three node link structures (node link structure 1 402, node link structure 2 404, and node link structure n 406). However, note that the third node link structure is numbered n to indicate that additional node link structures are possible and contemplated. With regard to the "shade" example, "shade" happens to be represented in the first node link structure. When literary and/or linguistic information is requested about "shade," the display system 100 determines that such information is in node link structure 1 (402).

Figure 5:
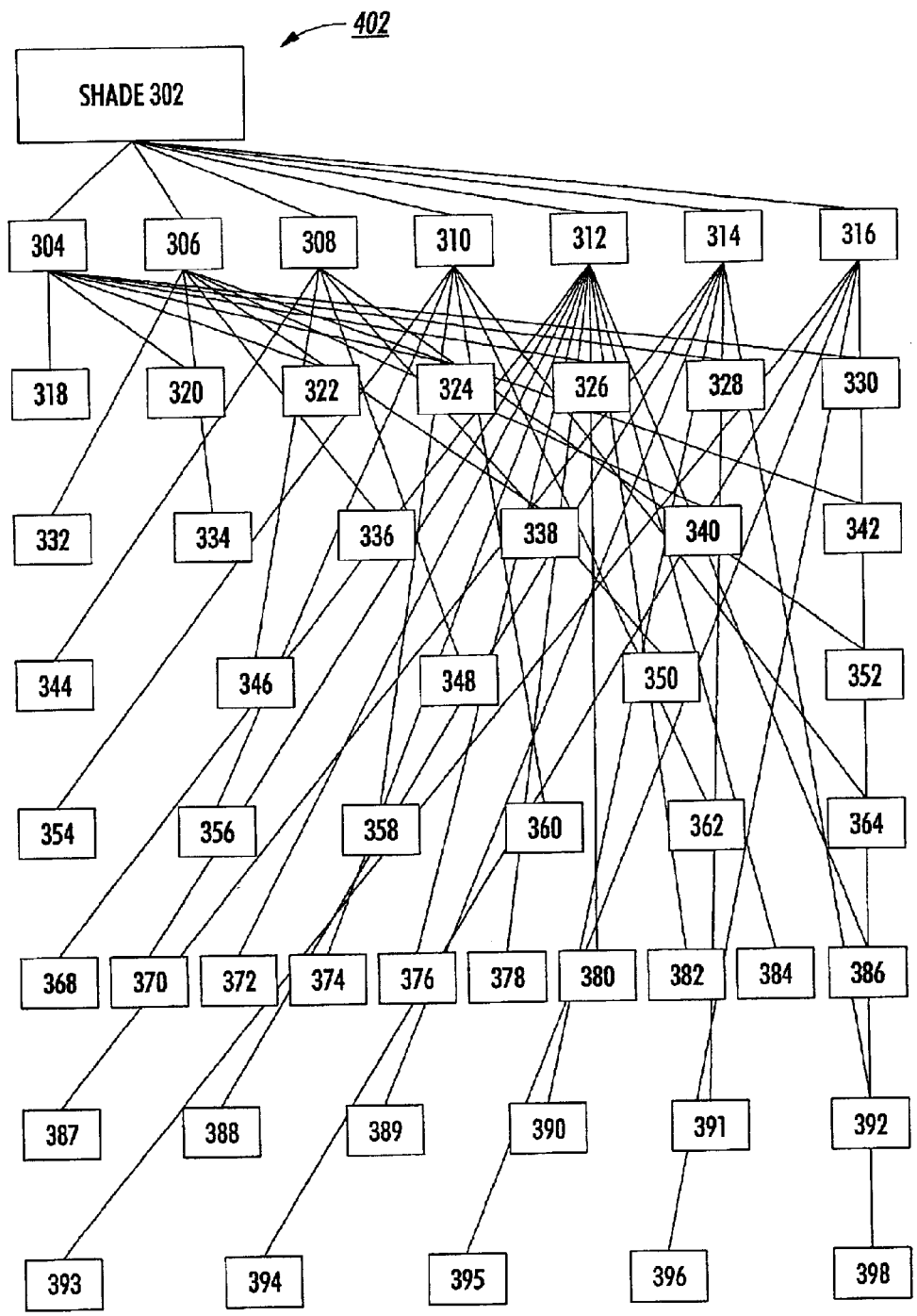
FIG. 5 is a diagram of a portion of a node link structure of FIG. 4, arranged by reference number, consistent with the "shade" example of FIG. 3, and in accordance with the preferred embodiment of the present invention.

With reference to FIG. 5 and continuing with the "shade" example, a diagram of a portion of node link structure 1 of FIG. 4 in accordance with the preferred embodiment of the present invention is provided. After determining that literary and/or linguistic information about "shade" is in node link structure 1 (402), the display system 100 retrieves node link structure 1 (402) from the information set 400 for further processing. Node link structure 1 (402), a typical node link structure, is comprised of a plurality of related nodes and linked together according to certain relationships between the nodes. Before processing the request for information about "shade" the order of nodes in the retrieved node link structure could be any of numerous combinations. For example, FIG. 5 depicts a representation of the unprocessed node link structure in reference number sequence from left to right and top to bottom. The relationships between the nodes of the node link structure are depicted, but very difficult to perceive in the unprocessed representation. Nevertheless, consistent with the "shade" example, FIG. 5 includes the following links: (i) node 302 linked to nodes 304–316, (ii) node 304 linked to nodes 318–330, (iii) node 306 linked to nodes 332-342, (iv) node 308 linked to nodes 344–352, (v) node 310 linked to nodes 354–364, (vi) node 312 linked to nodes 368–386, (vii) node 314 linked to nodes 387–392, and (viii) node 316 linked to nodes 393–398.

Figure 6:
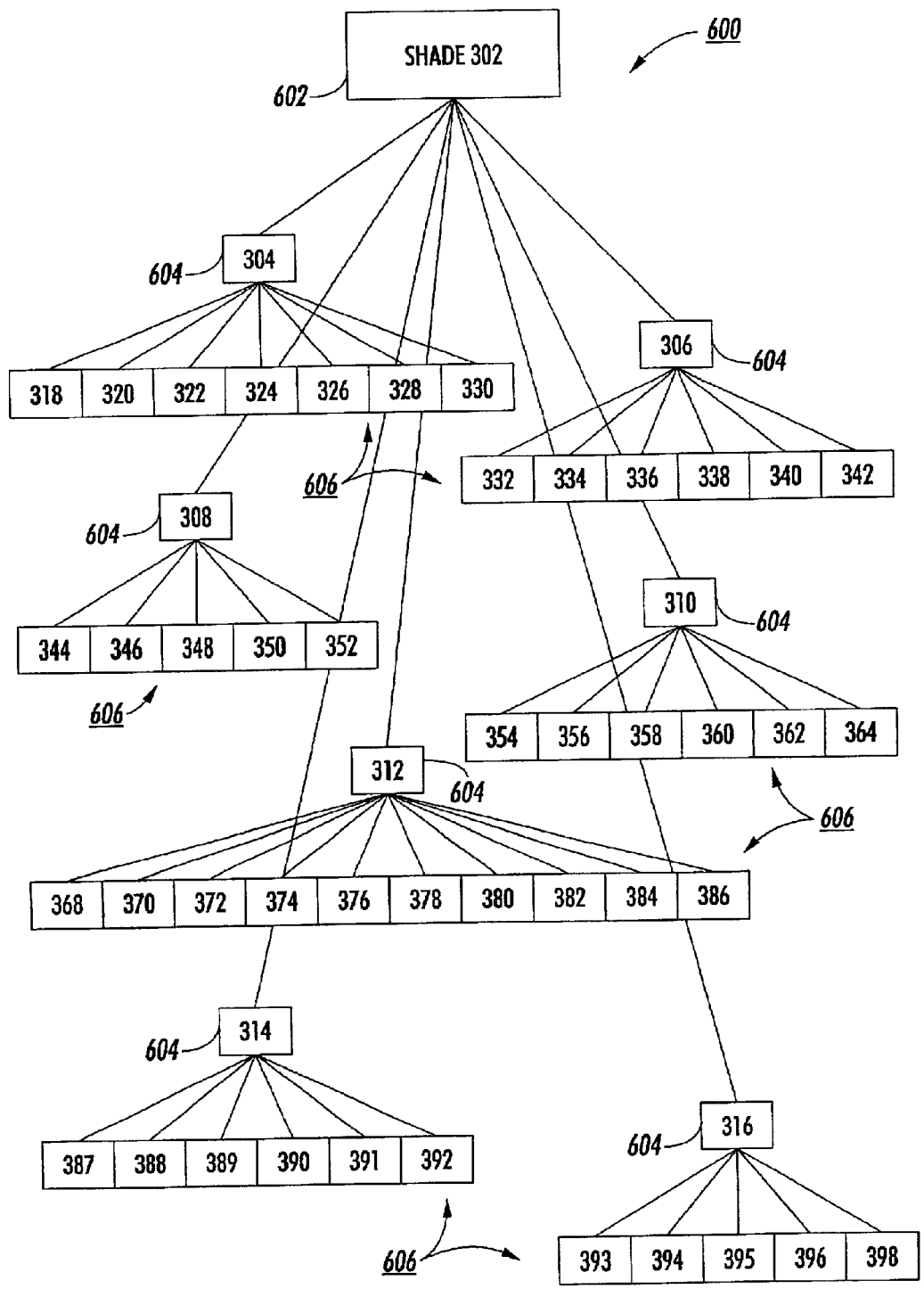
FIG. 6 is a diagram of a tree structure representing the node link structure of FIG. 5, consistent with the "shade" example of FIG. 3, and in accordance with the preferred embodiment of the present invention.

With reference to FIG. 6 and continuing with the "shade" example, a diagram of a tree structure 600 representing the node link structure 402 of FIG. 5 in accordance with the preferred embodiment of the present invention is provided. After retrieving the node link structure 402, the display system assigns hierarchical addresses to each node of the node link structure based on the request for literary and linguistic information about "shade" 302. The node corresponding to "shade" 302 is the "root" node and represented at the first level 602 of the hierarchical structure. The relationships between the nodes define how the lower levels of the hierarchical structure are represented. Based on the "shade" example, seven (7) nodes (304, 306, 308, 310, 312, 314, and 316) are represented at the second level 604. Further, 45 nodes (318–398) are represented at the third level 606. The 45 nodes at the third level (318–398) are divided under the seven (7) second-level nodes, as follows: (i) node 304 is associated with seven (7) third-level nodes (318–330), (ii) node 306 is associated with six (6) third-level nodes, (iii) node 308 is associated with five (5) third-level nodes (344–352), (iv) node 310 is associated with six (6)

third-level nodes (354–364), (v) node 312 is associated with ten (10) third-level nodes (368–386), (vi) node 314 is associated with six (6) third-level nodes (387–392), and (vii) node 316 is associated with five (5) third-level nodes (393–398).

With further reference to FIG. 3, the tree structure is shown mapped to a circular display area. To accomplish this, after the hierarchical addresses are assigned, the display system assigns display addresses to each node of the tree structure based on a previously determined three-dimensional surface function. For purposes of the "shade" example, the three dimensional surface is a hyperbolic surface bounded by a circle. The circle corresponds to the circular area of the display. This surface function is described further in the discussion of FIG. 9. Returning to FIG. 3, the display addresses represent a mapping of the tree structure about the surface shape of the hyperbolic surface. The display in the "shade" example also incorporates adjustments to offset the display addresses so that the "lookup" word (302) and its homonyms (304–312) appear closer to the viewer than the synonyms and antonyms (314–398), with the "lookup" word (302) appearing closest of all the nodes. Such display address adjustments are described further in the discussion of FIG. 12.

Figure 7:
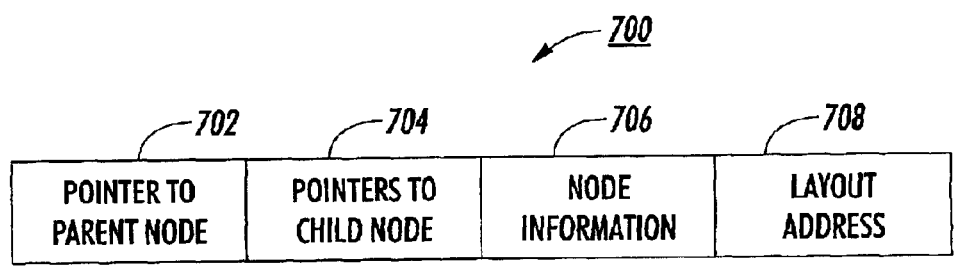
FIG. 7 is an illustration of a data structure for a node in accordance with the preferred embodiment of the present invention.

With reference to FIG. 7, a minimal data structure for a node of a node link structure in the preferred embodiment of the present invention is illustrated. As noted above, a tree structure is an instantiation of a node link structure. Data structures that contain more or less information than shown in FIG. 7 may also be utilized. Continuing with FIG. 7, the structure is comprised of a plurality of pointers 702, 704, node information 706 and a layout address for the node 708. The first pointer 702 points to a parent node and the remaining pointers 704 point to one or more child nodes. The pointers 702, 704 are typical for placing a node link structure in a tree structure representation. The node information 706 may contain a label for the node to be used when it is displayed, or it may contain a pointer to such information. The layout address 708 contains the address for the node with respect to the hierarchy and the display as assigned in the layout step described in FIGS. 10–12. As will be described in greater detail below, the display address included in the layout address 708 represents an adjustment of the nodes of the two-dimensional hierarchical tree. The adjustment is made to the position of nodes in the three-dimensional space and is typically influenced by the level of nodes in the tree.

Figure 8:
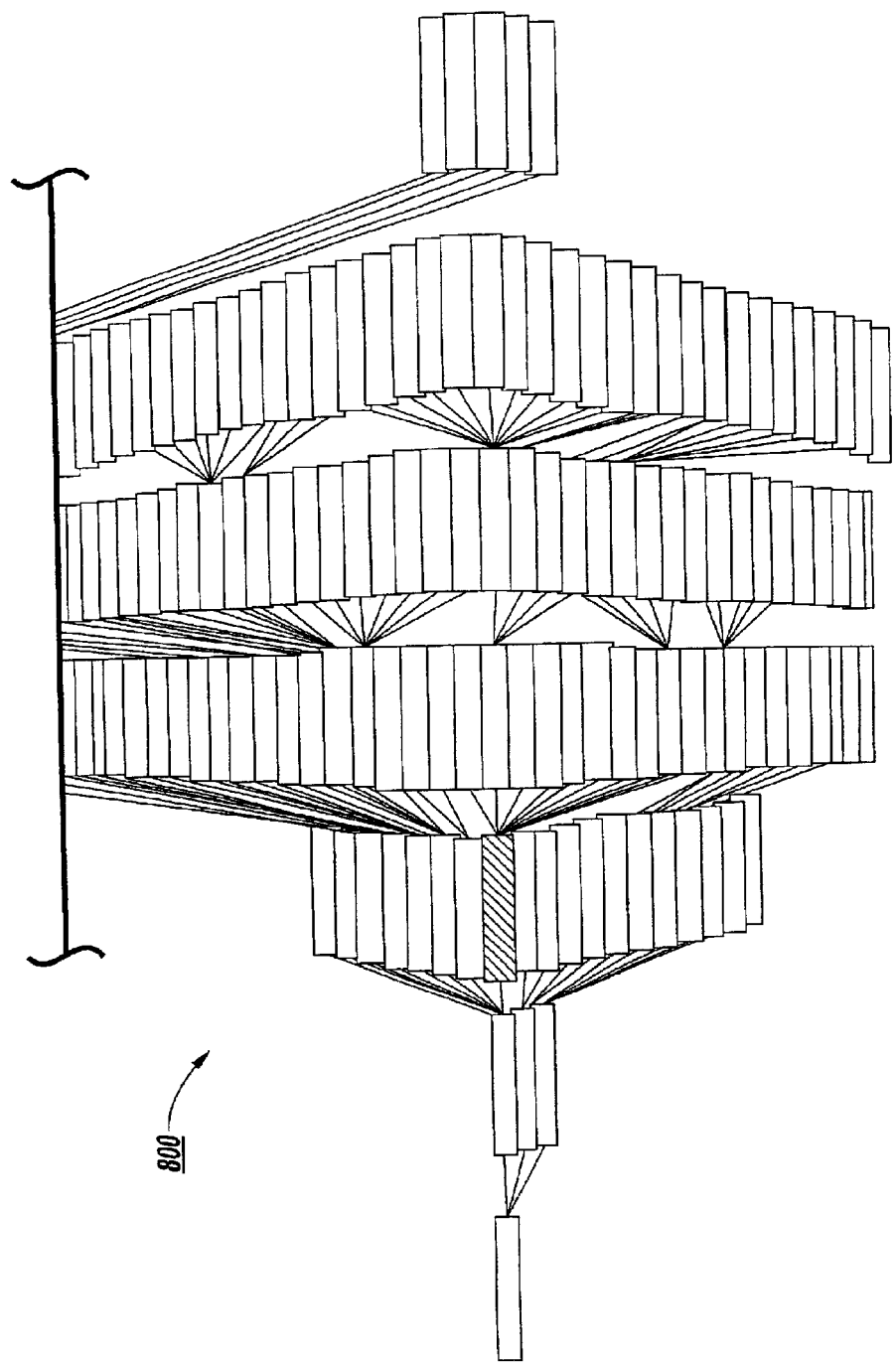
FIG. 8 is a first example of mapping a tree structure (e.g., FIG. 6) on a hyperbolic surface, where each level of the tree structure is mapped along a hyperbola (actually half a hyperbola) in a hyperbolic surface, in accordance with a preferred embodiment of the present invention.

In reference to FIG. 8, a first example of mapping a tree structure on a hyperbolic surface, as in a preferred embodiment of the present invention, is shown. The hyperbolic surface extends back in the Z direction. Via the steps described in FIGS. 10–12, each level of the tree structure is laid out along a unique hyperbola in the hyperbolic surface. Each hyperbola is defined according to Y and Z coordinates. The X coordinate is unchanged from its original planar address. The formula for deriving the Y and Z coordinates is $Z^{}2/a^{}2 - Y^{}2/b^{}2 = 1$ where a and b are constants defining the semi-axes of the hyperbolic surface. It has been determined experimentally that values a=5 and b=7 provide acceptable results. As shown, this mapping results in the levels of the tree structure descending from left to right along a central horizontal axis. Further examples of mapping trees structures to three-dimensional surfaces are contemplated, including those describe in Robertson '820, incorporated herein by reference.

Figure 9:
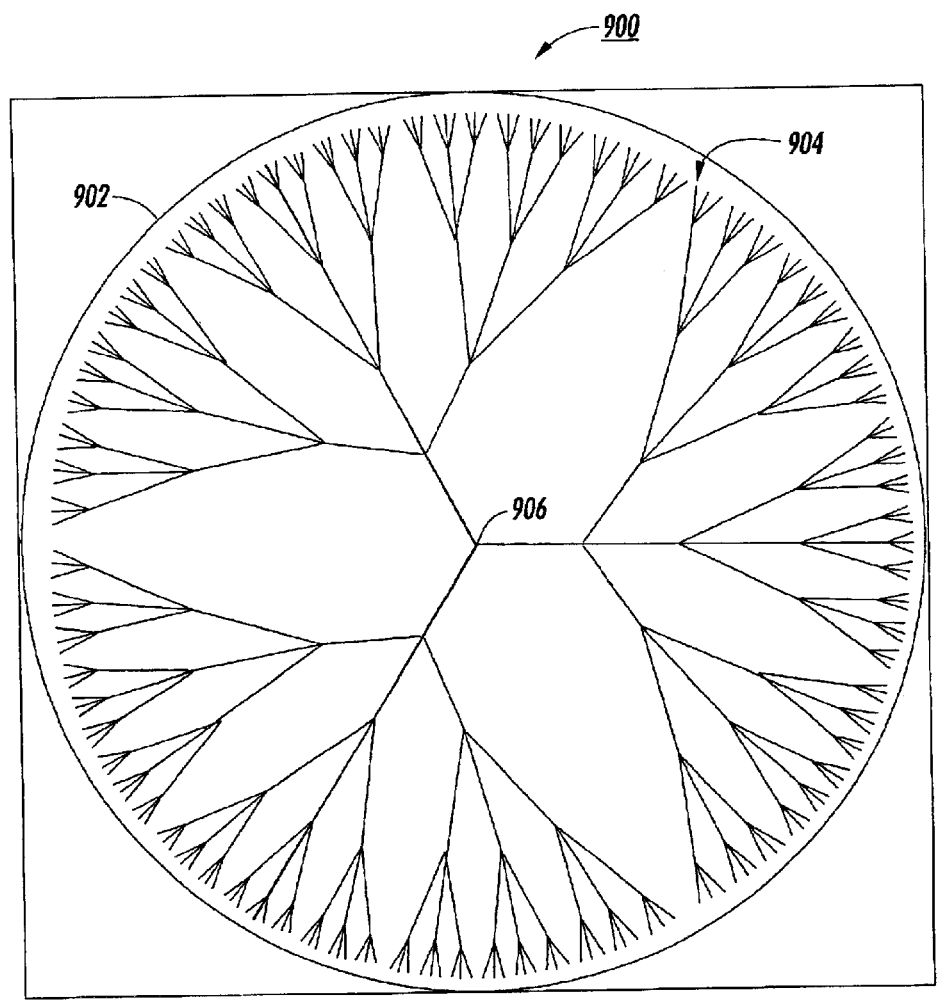
FIG. 9 is a second example of mapping a tree structure (e.g., FIG. 6) on a hyperbolic surface, where the tree structure is laid out in a uniform circular manner and the hyperbolic surface is bounded by a corresponding circle, in accordance with a preferred embodiment of the present invention.

In reference to FIG. 9, a second example of mapping a tree structure on a hyperbolic surface, as in a preferred embodiment of the present invention, is shown. The tree structure 904 is laid out in a uniform circular manner and the hyperbolic surface 902 is bounded by a corresponding circle. The root node 906 of the tree structure 904 is mapped in a region of greater spacing at the center and with peripheral branches mapped near the edge. FIG. 9 shows a rendered display 900 within which is presented the tree structure 904 mapped to the hyperbolic surface 902. The tree structure 904 includes link features that are lines representing links between nodes in a node link structure and node features that are simply intersections or ends of lines. The represented node link structure is a uniform tree of depth 5 and branching factor 3, with 364 nodes. The node features representing children of each node span about the same angle, except near the root node 906, where a larger wedge was available initially. Further examples of mapping tree structures to circular display regions using hyperbolic functions are contemplated, including those describe in Lamping et al. '250 and Lamping et al. '632, incorporated herein by reference.

Figure 10:
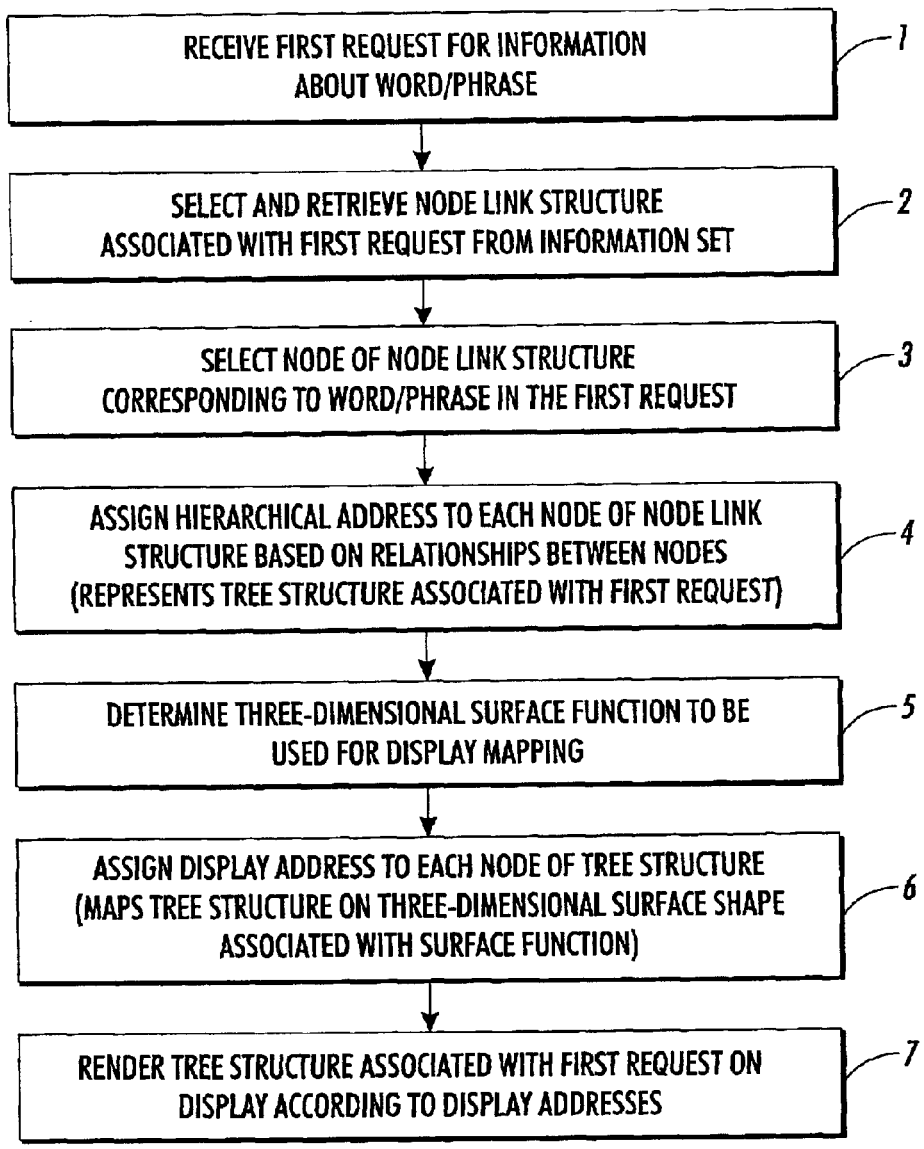
FIG. 10 is a flowchart of the general steps performed in response to a first request for literary and linguistic information about a word/phrase in accordance with a preferred embodiment of the present invention.
Figure 11:
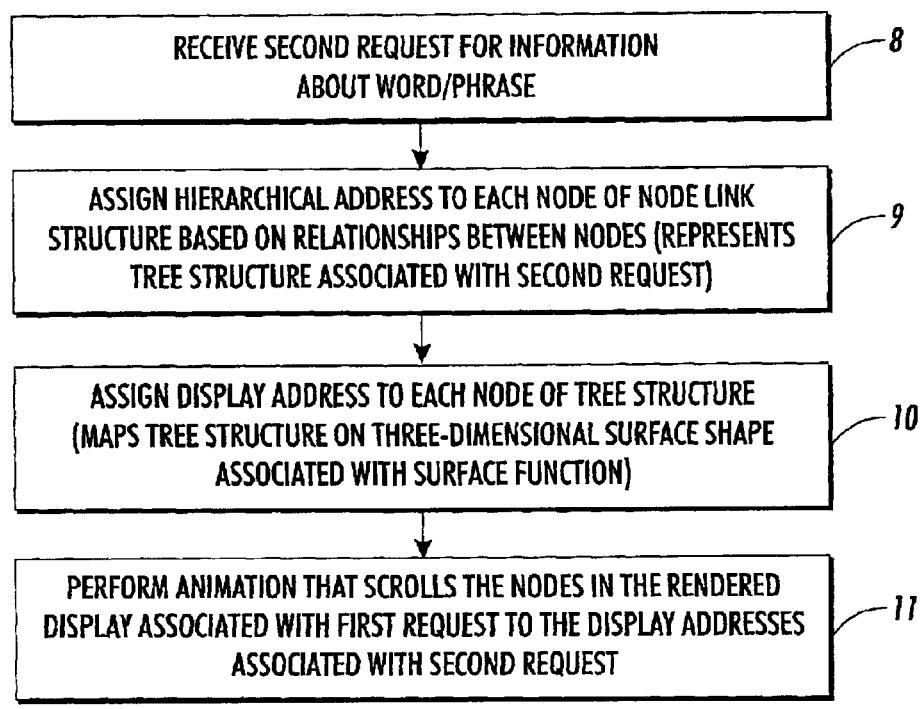
FIG. 11 is a flowchart of the general steps performed in response to a second request for literary and linguistic information about a word/phrase in accordance with a preferred embodiment of the present invention.
Figure 12:
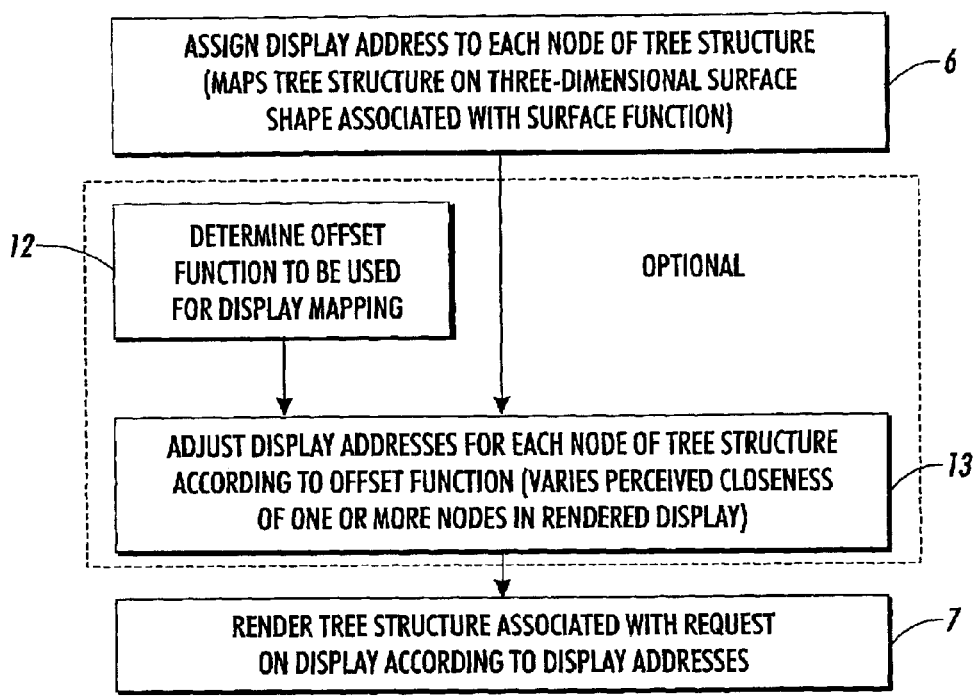
FIG. 12 is a flowchart showing additional steps used in conjunction with the flowchart of FIG. 10 to adjust the response to a request for literary and linguistic information about a word/phrase in accordance with a preferred embodiment of the present invention.

The general steps performed in response to a request for literary and linguistic information are described with references to the flowcharts of FIGS. 10–12. In the "shade" example of FIGS. 3–6, the literary and linguistic information set in the preferred embodiment of the present invention provided thesaurus-type relationships, including homonyms, synonyms, and antonyms, to "lookup" words/phrases. However, literary and linguistic information includes both relationships between words/phrases and attributes of the word/phrase. In addition to homonyms, synonyms, and antonyms, the relationships contemplated for the present invention include roots, derivatives, variants, inflected forms, and foreign language translations. The attributes contemplated for the present invention include definitions, pronunciations, etymology, and usage. Such relationships and attributes can be provided individually or in any combination in a given set of literary and linguistic information. In reference to FIG. 10, a first request for information about a word/phrase is received by the display system in step 1. At step 2, the display system selects a node link structure associated with the first request from the one or more node link structures in the information set. Also at step 2, the selected node link structure is retrieved from the storage device. Next, at step 3, the display system selects a node of the node link structure corresponding to the word/phrase in the first request. The selected node is identified as the "root" node for purposed of defining a hierarchical tree structure. At step 4, the display system assigns hierarchical addresses to each node of the node link structure based on the relationships between the nodes. The hierarchical addresses represent a two-dimensional layout of the node link structure in a tree structure specifically associated with the first request. Various techniques for laying out a tree structure on a two-dimensional plane are known in the art and could be used with the present invention. In the preferred embodiment of the present invention, a layout technique described in U.S. Pat. No. 5,333,254 is utilized.

Once the tree structure is laid out on a two-dimensional plane each node will have associated with it a hierarchical address. This hierarchical address may be directly mapped to a display address or it may require some scaling in order for it to fit in the display area. In any event, at step 5, a three-dimensional surface function (e.g., hyperbolic function) to be used for display mapping is determined. Preferably, this is done automatically according to some predetermined criteria relating to the size and shape of the tree structure. Alternatively, a user could specify a desired shape via a menu. In any event, although exact timing is not critical, the surface function must be determined before step 6. At step 6, display addresses are assigned to each node of the tree structure. This represents a mapping of the tree structure about a surface shape associated with the surface function. This mapping is conceptually analogous to bending the tree structure about the surface shape and creates a three-dimensional visual effect for the displayed portions of the tree structure. At step 7, the tree structure is rendered on the display according to the display addresses. The resulting display provides detailed and context literary and linguistic information about the word/phrase in the first request.

In reference to FIG. 11, a flowchart of the general steps performed in response to a second request for literary and linguistic information about a word/phrase is provided. These steps generally relate to scrolling the display rendered in FIG. 10 create another display in response to the second request. Note that the preferred embodiment utilizes techniques for scrolling as described in Robertson '254 and Lamping et al. '250, both of which are incorporated herein by reference. Note that in Lamping et al. '250 such scrolling is described as displaying a second representation of a node link structure in a manner so that it is perceived as a changed continuation of a first representation of the node link structure.

Continuing with FIG. 11, at step 8, a second request for information about a word/phrase is received. The word/phrase in the second request is represented by a second or lower level node in the tree structure of the currently rendered display. At step 9, the display system assigns hierarchical addresses to each node of the node link structure based on the relationships between the nodes. This time, however, the hierarchical addresses represent a different two-dimensional layout of the node link structure because the tree structure is specifically associated with the second request. Next, at step 10, display addresses are assigned to each node of the tree structure. This represents a mapping of the tree structure about a surface shape associated with the surface function. Like, for step 9, this three-dimensional layout is different from the layout of for the first request because it is specifically associated with the second request. At step 11, an animation is performed that scrolls the nodes in the current rendered display associated with the first request to the display addresses associated with the second request. The resulting display provides detailed and context literary and linguistic information about the word/phrase in the second request.

In reference to FIG. 12, a flowchart showing optional steps 12 and 13 in context with steps 6 and 7 of FIG. 10 is provided. The additional optional steps show a technique for offsetting the display addresses to adjust the visual effect creating by mapping the tree structure to a three-dimensional surface shape. Step 6 is shown to indicate that display addresses have already been assigned to each node of the tree structure. The display addresses represent a mapping of the tree structure about the surface shape. At step 12, an offset function to be used for display mapping is determined. Preferably, this is done automatically according to some predetermined criteria. Alternatively, a user could specify a desired offset function via a menu. In any event, although exact timing is not critical, the offset function must be determined before step 13. At step 13, display addresses are adjusted for each node of the tree structure according to the offset function. This represents an adjustment in the mapping of the tree structure about a surface shape to vary the perceived closeness of one or more nodes in the rendered display. Finally, at step 7, the tree structure is rendered on the display according to the adjusted display addresses. The resulting display provides detailed and context literary and linguistic information about the word/phrase in the request.

Next, as an optional step, an offset may be added to the derived Y and Z addresses to control the "closeness" at which the tree structure appears to the viewer, step 603. The offset applied depends on the particular level at which the node is. The effect of drawing the structure closer to the viewer, as expected, causes the tree and corresponding text to be larger. It has been determined experimentally that an offset equation of N×5 inches, where N is the level of the tree structure for the node, produces acceptable results.

Note that it would also be possible to implement the present invention so that the three-dimensional surface function is different for each level of a tree structure or that mapping only occurs under certain circumstances (e.g. when the number of nodes in a level exceeds a certain threshold). As noted above, various surface functions may be utilized in the preferred embodiment of the present invention. Two-dimensional shape formulas for various surface functions can be found in various references, e.g. "MATHEMATICAL TABLES FROM HANDBOOK OF CHEMISTRY AND PHYSICS ELEVENTH EDITION", Copyright 1959 by THE CHEMICAL RUBBER PUBLISHING COMPANY, Cleveland, Ohio. Each of the shape formulas includes constants that define the actual end shape. Through experimentation, values for the constants have been determined which provide acceptable results. Generally, the horizontal coordinate for a node will remain fixed while the shape formula is used to find vertical and depth coordinates.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for displaying information from a literary and linguistic information set on a display, the information set comprising one or more node link structures, each node link structure comprising a plurality of related nodes, each node representing a word, a phrase, or an attribute of a word/phrase, the relationships between nodes within each node link structure being based on established literary and linguistic practices, the method comprising the steps of:

a) receiving a first request for literary and/or linguistic information about a word/phrase;

b) selecting and retrieving a node link structure from the information set based on the first request;

c) assigning a hierarchical address to each node in said node link structure based on the first request, the hierarchical addresses representing a layout of said node link structure in a tree structure;

d) assigning a display address to each node in the tree structure based on a previously determined surface function, the display addresses representing a mapping of the tree structure about a surface shape corresponding to the surface function; and e) rendering the tree structure on the display according to the display addresses so that literary and/or linguistic information associated with the first request is displayed, wherein one or more nodes of the tree structure is perceived as closer to a viewer than other nodes in the rendered display based at least in part on the surface function and corresponding surface shape.

2. The method for displaying information from a literary and linguistic information set of claim 1, the method further including the steps of:

f) receiving a second request for literary and/or linguistic information about a word/phrase represented by a second or lower level node in the tree structure of the rendered display;

g) repeating step c), assigning a hierarchical address to each node in the node link structure based on the second request;

h) repeating step d), assigning a display address to each node in the tree structure based on the second request; and i) performing an animation that scrolls the rendered display such that the nodes of the node link structure scroll about the surface shape from a first position corresponding to the display addresses assigned to the tree structure based on the first request to a second position corresponding to the display addresses assigned to the tree structure based on the second request.

3. The method for displaying information from a literary and linguistic information set of claim 1, wherein the surface function of step d) is a hyperbolic function.

4. The method for displaying information from a literary and linguistic information set of claim 1, wherein step d) is further comprised of a step of adding an offset to the display address for each node based on the relationships between the nodes in the tree structure.

5. A method for displaying literary and/or linguistic information about a word/phrase on a display of a display system, the method comprising the steps of:

a) receiving a request for literary and/or linguistic information about a word/phrase;

b) selecting the literary and/or linguistic information to be displayed from a literary and linguistic information set, said information set comprising one or more node link structures, each node link structure comprising a plurality of related nodes, by selecting a node link structure associated with the request;

c) assigning a hierarchical address to each node in the selected node link structure based on the request, whereby each node represents a word, a phrase, or an attribute of a word/phrase and the relationships between nodes are based on established literary and linguistic practices, the hierarchical addresses representing a layout of the selected node link structure in a tree structure with a root node at the first hierarchical level corresponding to the word/phrase in the request and lower levels populated according to the relationships between the nodes;

d) assigning a display address to each node in the tree structure based on a previously determined surface function, the display addresses representing a mapping of the tree structure about a surface shape corresponding to the surface function; and e) rendering the tree structure on the display according to the display addresses so that the literary and/or linguistic information associated with the word/phrase in the request is displayed, wherein one or more nodes of the tree structure is perceived as closer to a viewer than other nodes in the rendered display based at least in part on the surface function and corresponding surface shape.

6. The method for displaying information of claim 5, wherein the information includes one or more homonyms of the word/phrase in the request.

7. The method for displaying information of claim 5, wherein the information includes one or more synonyms of the word/phrase in the request.

8. The method for displaying information of claim 5, wherein the information includes one or more antonyms of the word/phrase in the request.

9. The method for displaying information of claim 5, wherein the information includes a root of the word/phrase in the request.

10. The method for displaying information of claim 5, wherein the information includes one or more derivatives of the word/phrase in the request.

11. The method for displaying information of claim 5, wherein the information includes one or more variants of the word/phrase in the request.

12. The method for displaying information of claim 5, wherein the information includes one or more inflected forms of the word/phrase in the request.

13. The method for displaying information of claim 5, wherein the information includes one or more foreign language translations of the word/phrase in the request.

14. The method for displaying information of claim 5, wherein the information includes one or more definitions of the word/phrase in the request.

15. The method for displaying information of claim 5, wherein the information includes one or more pronunciations of the word/phrase in the request.

16. The method for displaying information of claim 5, wherein the information includes an etymology of the word/phrase in the request.

17. The method for displaying information of claim 5, wherein the information includes one or more usages of the word/phrase in the request.

18. A display system for displaying information from a literary and linguistic information set, the information set comprising one or more node link structures, each node link structure comprising a plurality of related nodes, each node comprising a word, a phrase, or an attribute of a word/phrase, the relationships between nodes of each node link structure being based on established literary and linguistic practices, said display system comprising:

a storage device for storing the information set;

an input device for receiving a first request for literary and/or linguistic information about a word/phrase;

a display for displaying literary and/or linguistic information associated with the first request;

a processor coupled to the input device, storage device, and display for processing the first request, retrieving a node link structure associated with the first request from the storage device, assigning a hierarchical address to each node in said node link structure based on the first request, the hierarchical addresses representing a layout of said node link structure in a tree structure, assigning a display address to each node in the tree structure based on a previously determined surface function, the display addresses representing a mapping of the tree structure about a surface shape corresponding to the surface function, and rendering the tree structure on the display according to the display addresses so that literary and/or linguistic information associated with the first request is displayed, wherein one or more nodes of the tree structure is perceived as closer to a viewer than other nodes in the rendered display based at least in part on the surface function and corresponding surface shape.

19. The display system of claim 18, the display system further including a scrolling means for scrolling the tree structure of the rendered display about the surface shape based on a second request for literary and/or linguistic information about a word/phrase represented by a second or lower level node in the tree structure of the rendered display.

20. The display system of claim 18, wherein the surface function is a hyperbolic function.

21. The display system of claim 18, the display system further including an offsetting means for adjusting the display addresses so that one or more nodes of the tree structure is perceived as closer to a viewer than other nodes in the rendered display.

* * * * *

UNITED STATES PATENT AND TRADEMARK OFFICE
CERTIFICATE OF CORRECTION

PATENT NO. : 6,918,097 B2
DATED : July 7, 2005
INVENTOR(S) : Michael A. Parisi

It is certified that error appears in the above-identified patent and that said Letters Patent is hereby corrected as shown below:

<u>Title page,</u>
Item [75], Inventor, should read -- Michael A. Parisi, Fairport, NY (US) --.

Signed and Sealed this

Sixth Day of September, 2005

JON W. DUDAS
*Director of the United States Patent and Trademark Office*